United States Patent
Ma et al.

(10) Patent No.: US 10,922,201 B2
(45) Date of Patent: Feb. 16, 2021

(54) METHOD AND DEVICE OF DATA REBUILDING IN STORAGE SYSTEM

(71) Applicant: EMC IP Holding Company LLC, Hopkinton, MA (US)

(72) Inventors: Chun Ma, Beijing (CN); Geng Han, Beijing (CN); Xinlei Xu, Beijing (CN); Shaoqin Gong, Beijing (CN); Baote Zhuo, Beijing (CN); Haiying Tang, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 98 days.

(21) Appl. No.: 16/249,191

(22) Filed: Jan. 16, 2019

(65) Prior Publication Data
US 2019/0220377 A1 Jul. 18, 2019

(30) Foreign Application Priority Data
Jan. 18, 2018 (CN) .......................... 201810050815.9

(51) Int. Cl.
*G06F 11/00* (2006.01)
*G06F 11/20* (2006.01)
*G06F 3/06* (2006.01)
*G06F 11/10* (2006.01)

(52) U.S. Cl.
CPC .......... *G06F 11/2094* (2013.01); *G06F 3/065* (2013.01); *G06F 3/0619* (2013.01); *G06F 3/0689* (2013.01); *G06F 11/1076* (2013.01); *G06F 2201/82* (2013.01)

(58) Field of Classification Search
CPC ............ G06F 11/2094; G06F 11/1076; G06F 11/0727; G06F 11/1008; G06F 11/1092; G06F 3/0619; G06F 3/065; G06F 3/0689; G06F 2201/82
See application file for complete search history.

(56) References Cited

U.S. PATENT DOCUMENTS

| 7,350,046 | B2 | 3/2008 | Sicola et al. | |
| 2013/0198585 | A1* | 8/2013 | Braam | G06F 11/1076 714/763 |
| 2015/0046756 | A1* | 2/2015 | Sreekumaran | G06F 11/008 714/47.2 |
| 2017/0300393 | A1* | 10/2017 | Sreedhar M | G06F 11/1076 |

* cited by examiner

*Primary Examiner* — Joseph D Manoskey
(74) *Attorney, Agent, or Firm* — BainwoodHuang (57) ABSTRACT

Techniques provide for data rebuilding in a storage system. The techniques involve: in response to failure of a first disk in the storage system, determining a second disk having a high risk of failure in the storage system; determining whether the second disk contains a second data block that is associated with a first data block to be rebuilt in the first disk, the first and second data blocks being from a same data stripe in the storage system; and in response to determining that the second disk contains the second data block and the second data block has not yet been replicated into a third disk for backup in the storage system, reading the second data block from the second disk to rebuild the first data block, and replicating the read second data block into the third disk.

14 Claims, 8 Drawing Sheets

METHOD AND DEVICE OF DATA REBUILDING IN STORAGE SYSTEM

FIELD

Embodiments of the present disclosure generally relate to storage system, and more specifically, to a method and device of data rebuilding in a storage system.

BACKGROUND

Redundant array of independent disks (RAID), as a virtual technology in data storage, combines a plurality of physical disks into one or more logic units in order to achieve data redundancy and performance enhancement in a storage system. Mapped RAID, as a subclass of RAID, implements RAID algorithm on the basis of disk extents (rather than the whole disk). Typically, the size of each disk extent is several gigabytes (GB) or tens of gigabytes. The RAID algorithm implemented in the mapped RAID is the same as that implemented in the conventional RAID except that the resource unit manipulated by the mapped RAID algorithm is changed from the entire disk in the conventional RAID to the disk extent.

In the RAID system described above, if a disk operates with an error (or abnormally), the disk will be marked as "End of Life (EOL)." At this point, a proactive copy (PACO) process will be initiated. The PACO process will select a spare disk and migrate all disk extents in the disk marked as EOL into the selected spare disk. After the migration of the disk extents is completed, the EOL disk will be replaced by the spare disk as a new disk in the extent pool. On the other hand, if one of the disks in the disk array is damaged, a RAID reconstruction process will be initiated to rebuild the lost data in the damaged disk.

SUMMARY

Embodiments of the present disclosure provide a data rebuilding method and device in a storage system, particularly in, for instance, a redundant array of independent disks (RAID) system.

A first aspect of the present disclosure provides a method of data rebuilding in a storage system, the method including: in response to failure of a first disk in a storage system, determining a second disk having a high risk of failure in the storage system. The method further includes determining whether the second disk contains a second data block that is associated with a first data block to be rebuilt in the first disk, wherein the first and second data blocks are from the same data stripe in the storage system. In addition, the method further includes: in response to determining that the second disk contains the second data block and the second data block has not yet been replicated into a third disk for backup in the storage system, reading a second data block from the second disk for rebuilding the first data block, and replicating the read second data block into the third disk.

In accordance with embodiments of the present disclosure, the method may further include: in response to determining that the second disk contains the second data block and the second data block has already been replicated into the third disk, reading the second data block from the third disk to rebuild the first data block.

In accordance with embodiments of the present disclosure, the method may further include: after rebuilding of the first data block in the first disk is completed, replicating the third data block in the second disk into the third disk, wherein the first and third data blocks are from different data stripes in the storage system.

In accordance with embodiments of the present disclosure, the step of determining the second disk having a high risk of failure may include: for a disk in the storage system, detecting an operating condition of the disk. The determining step may further include determining that a disk is the second disk in response to detecting at least one of the following: an operation of the disk fails. and an operation threshold of the disk is reached.

In accordance with embodiments of the present disclosure, the method may further include writing the rebuilt first data block into a spare disk in the storage system, and updating the version number of the rebuilt first data block.

In accordance with embodiments of the present disclosure, the method may further include replicating metadata of the second data block into the third disk.

A second aspect of the present disclosure provides a device of data rebuilding in a storage system, the device including: a processing unit and a memory coupled to the processing unit and storing instructions. The instructions, when executed by the processing unit, implement the following acts: in response to failure of a first disk in a storage system, determining a second disk having a high risk of failure in the storage system; determining whether the second disk contains a second data block that is associated with a first data block to be rebuilt in the first disk, the first and second data blocks being from the same data stripe in the storage system; and in response to determining that the second disk contains the second data block and the second data block has not yet been replicated into a third disk for backup in the storage system, reading a second data block from the second disk to rebuild the first data block, and replicating the read second data block into the third disk.

In accordance with embodiments of the present disclosure, the acts may further include: in response to determining that the second disk contains the second data block and the second data block has already been replicated into the third disk, reading the second data block from the third disk to rebuild the first data block.

In accordance with embodiments of the present disclosure, the acts may further include: after rebuilding of the first data block in the first disk is completed, replicating the third data block in the second disk into the third disk, wherein the first and third data blocks are from different data stripes in the storage system.

In accordance with embodiments of the present disclosure, the step of determining the second disk having a high risk of failure may include: for a disk in the storage system, detecting an operating condition of the disk, and determining that a disk is the second disk in response to detecting at least one of the following: an operation of the disk operates fails, and an operation threshold of the disks is reached.

In accordance with embodiments of the present disclosure, the acts may further include writing the rebuilt first data block into a spare disk in the storage system, and updating the version number of the rebuilt first data block.

In accordance with embodiments of the present disclosure, the acts may further include replicating metadata of the second data block into the third disk.

A third aspect of the present disclosure provides a computer program product for data rebuilding. The computer program product is tangibly stored on a non-transient computer readable medium and includes machine-executable instructions, the machine-executable instructions, when executed, causing the machine to implement steps of the method according to the first aspect of the present disclosure.

A fourth aspect of the present disclosure provides a computer program product which is tangibly stored on a non-transient computer readable medium and includes machine-executable instructions, the machine-executable instructions, when executed, causing the machine to implement the following acts: in response to failure of a first disk in a storage system, determining a second disk having a high risk of failure in the storage system; determining whether the second disk contains a second data block that is associated with a first data block to be rebuilt in the first disk, the first and second data blocks being from the same data stripe in the storage system; and in response to determining that the second disk contains the second data block and the second data block has not yet been replicated into a third disk for backup in the storage system, reading the second data block from the second disk to rebuild the first data block, and replicating the read second data block into the third disk.

As a proactive copy process may be implemented at the same time as the data rebuilding process without any interruption, such operation can reduce the time of the background operation and the reading and writing times of the second disk having a high risk of failure.

BRIEF DESCRIPTION OF THE DRAWINGS

The drawings described in the present disclosure are provided herein to further explain the present disclosure and form a part of the present disclosure. Illustrative embodiments of the present disclosure and the depiction thereof are used to explain the present disclosure, rather than to limit the present disclosure inappropriately.

Throughout the drawings, the same or similar reference symbols refer to the same or similar elements.

DETAILED DESCRIPTION OF EMBODIMENTS

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document.

It should be understood that the specialized circuitry that performs one or more of the various operations disclosed herein may be formed by one or more processors operating in accordance with specialized instructions persistently stored in memory. Such components may be arranged in a variety of ways such as tightly coupled with each other (e.g., where the components electronically communicate over a computer bus), distributed among different locations (e.g., where the components electronically communicate over a computer network), combinations thereof, and so on.

Principles of the present disclosure will now be described with reference to various example embodiments illustrated in the drawings. Although example embodiments of the present disclosure are illustrated in the drawings, it is to be understood that the description of those embodiments is merely to enable those skilled in the art to better understand and further implement the present disclosure and is not intended for limiting the scope disclosed herein in any manner.

In the background operation of the current storage system, the priority of a rebuilding process is higher than that of a proactive copy (PACO) process. Therefore, when a PACO process is initiated as a disk in the system reaches its End of Life (EOL), if at this point another disk in the storage system becomes a failed disk due to the damage, the ongoing PACO process needs to be paused to execute the rebuilding process having higher priority, and the previously paused PACO process will be resumed after the rebuilding process is completed. This will cause the second disk already having a high risk of failure to be read twice due to the required implementation of both the PACO and rebuilding processes, which in turns enhances the risk of the second disk becoming a failed disk.

Besides, owing to the long operation time window resulting from the pause and resumption of PACO, the risk of data loss also increases. For example, during the rebuilding process, if the EOL disk also becomes a failed disk, a double failure (for example in RAID5) will be caused. On the other hand, during the PACO process, if the EOL disk becomes a failed disk, the redundancy in the extent pool will be lost.

In accordance with the solution described in various embodiments of the present disclosure, the PACO process is executed while the data rebuilding process without interrupting the ongoing PACO process, which shortens the total operation time. In addition, the second disk having a high risk of failure only needs to be read once to complete both the data rebuilding process and the PACO process, thereby reducing the probability of failure of the second disk and in turn ensuring the data redundancy.

Figure 1:
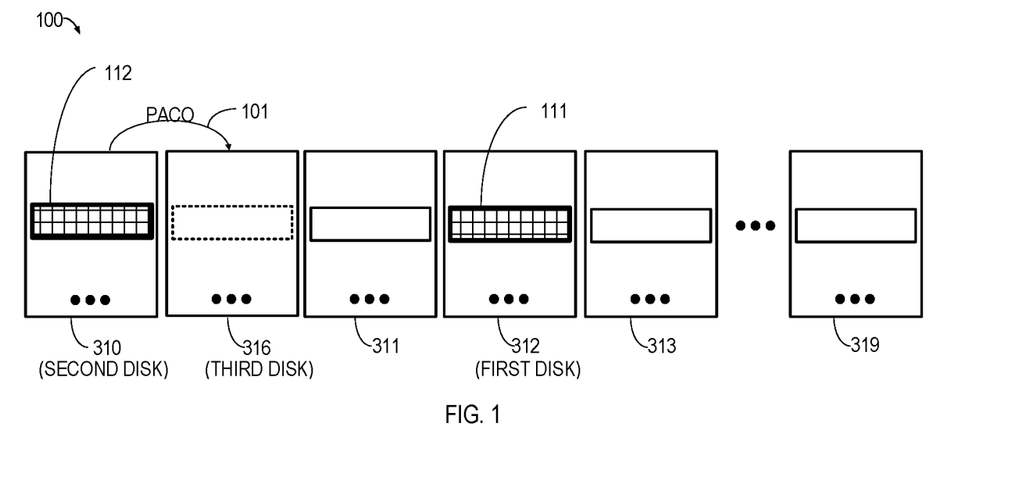
FIG. 1 schematically illustrates a storage system in accordance with an embodiment of the present disclosure.
Figure 2:
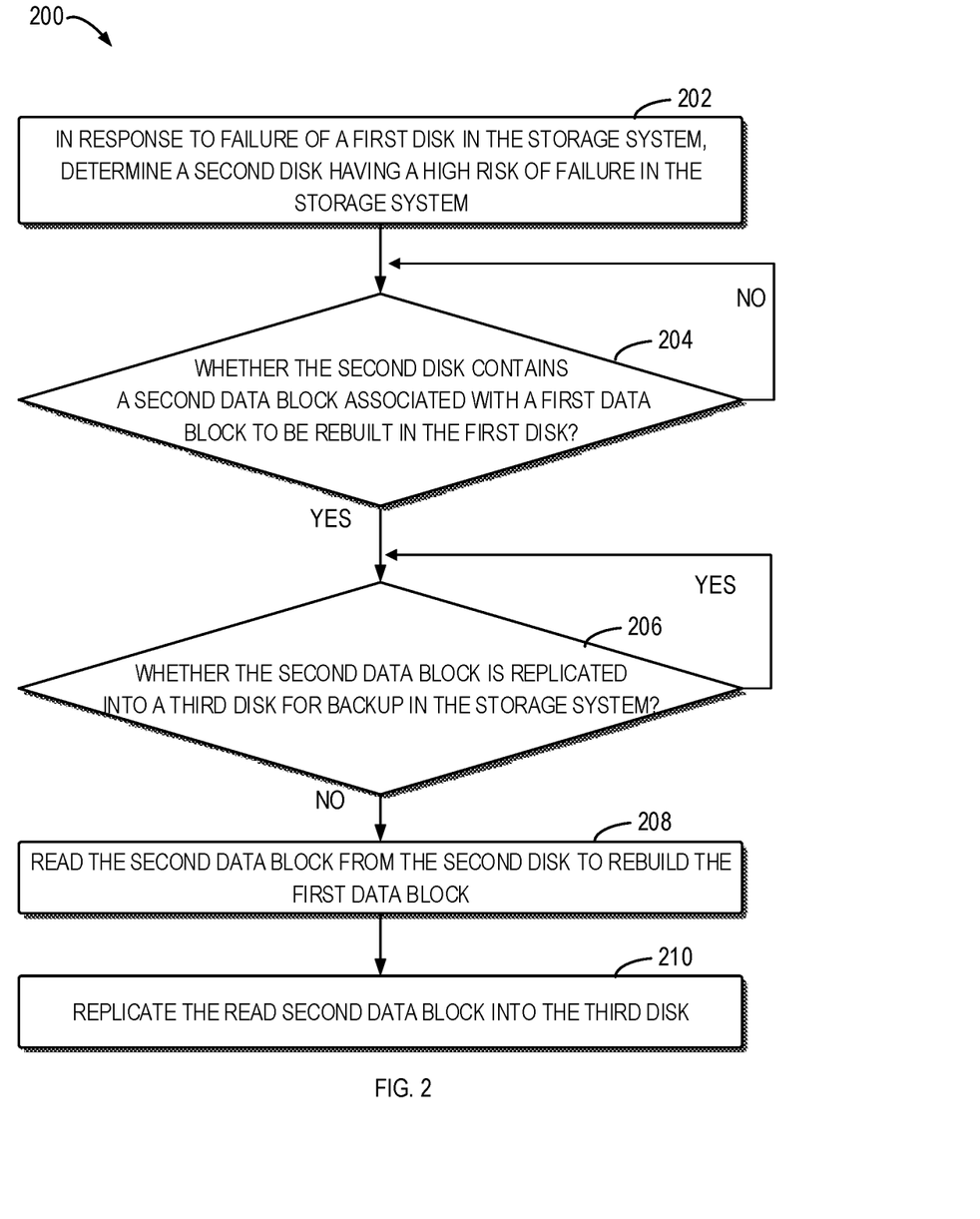
FIG. 2 is a flowchart illustrating a data rebuilding method used in the storage system, in accordance with an embodiment of the present disclosure.

FIG. 1 illustrates a storage system 100 in accordance with embodiments of the present disclosure. Without loss of generality, the storage system 100 as illustrated in FIG. 1 includes 10 disks (namely, disk 310, disk 311, disk 312, . . . , disk 319). It is to be noted that more or fewer disks are also applicable to the present disclosure. It is also to be noted that the method described in various embodiments of the present disclosure is applicable to various known RAID systems, for instance, RAID2, RAID5 and RAID6. FIG. 2 is a flowchart 200 illustrating a data rebuilding method for use in the storage system in accordance with embodiments of the present disclosure. The following description will be firstly made with reference to the RAID system 100 as shown in FIG. 1.

At 202, when a first disk is failed, a second disk having a high risk of failure is determined (or identified) in the storage system 100. For the ease of discussion, the disk that has already been failed in the RAID system will be referred to as the "first disk," and the disk having a high risk of failure is referred to as the "second disk" (also referred to as EOL disk). For example, in the example as shown in FIG. 1, disk 312 is the first disk and disk 310 is the second disk.

In some embodiments, in order to determine (or identify) the second disk having a high risk of failure in the storage system 100, the operating conditions of one or more disks in the storage system 100 are detected. If at least one of the following operating conditions is detected, the disk may be determined as the second disk having a high risk of failure: (1) the disk operates with an error, and (2) the disk reaches its operation threshold.

At 204, it is determined (or ascertained) whether the second disk contains a second data block 112 associated with a first data block 111 to be rebuilt in the first disk. In the present disclosure, the first data block 111 and the second data block 112 that are associated with each other refer to data blocks coming from a same data stripe in the storage system 100. Please note that at 204 it is possible to determine more than one first data block 111 or second data block 112. If it is determined that the second disk contains the second data block 112, then method 200 proceeds to 206.

At 206, it is determined whether the second data block 112 has already been replicated into a third disk 316 for backup in the storage system 100. If it is determined that the second data block has not yet been replicated into the third disk 316 for backup in the storage system 100, then method 200 proceeds to 208.

At 208, the second data block 112 is read from the second disk to rebuild the first data block 111.

At 210, the read second data block 112 is replicated into the third disk 316.

For the ease of discussion, the disk in the RAID system 100 for receiving data blocks from the second disk is referred to as the "third disk." Besides, herein the above process of replicating or migrating the second data block 112 into the third disk 316 is referred to as PACO process which is schematically illustrated by an arrow 101 in FIG. 1.

Figure 3:
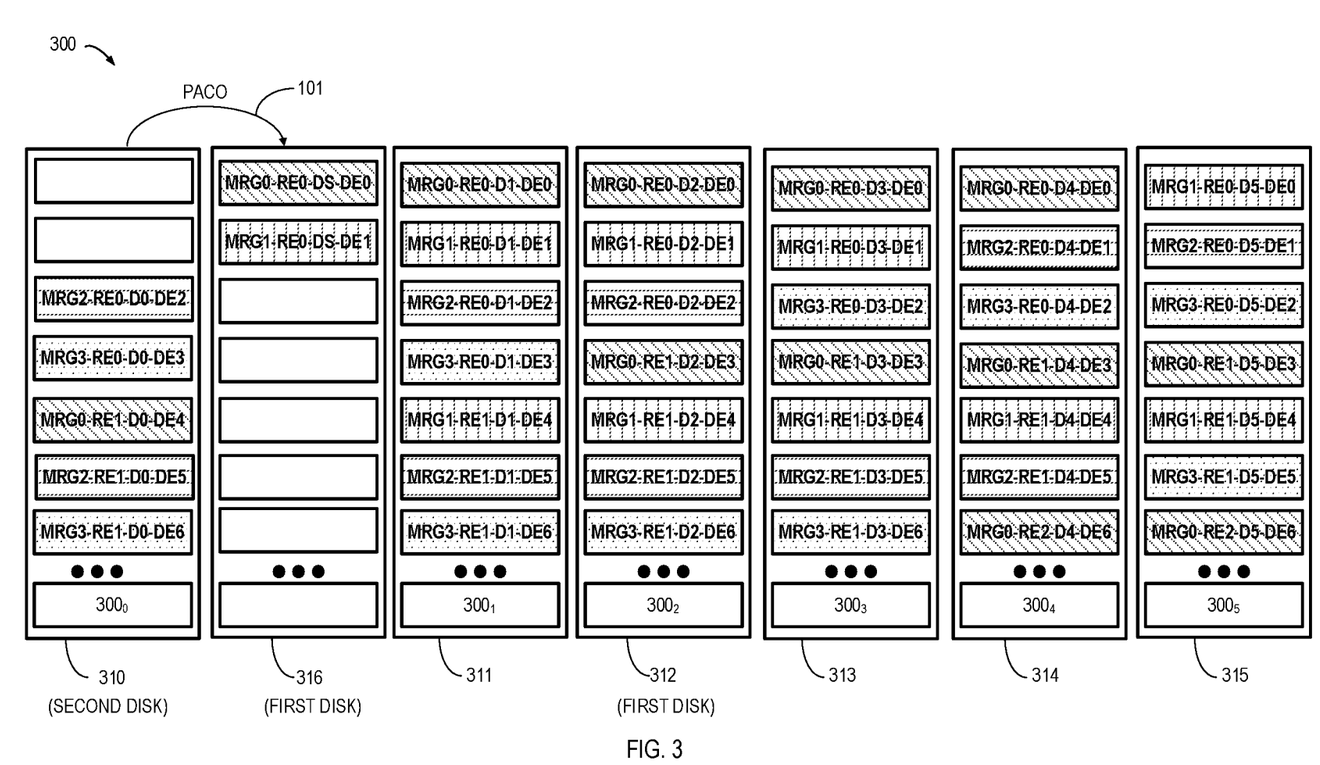
FIG. 3 illustrates a storage system at the start of the data rebuilding process, in accordance with an embodiment of the present disclosure.

The data rebuilding method in accordance with the present disclosure will be described further in combination with the embodiments as illustrated in FIGS. 3-7. The storage system 300 as shown in FIG. 3 includes: four mapped RAID groups, six disks (namely, disks 310 to 315), and a third disk 316 for backup.

For the ease of discussion, in the examples shown in FIGS. 3-7, each disk extent is identified in the following format:

MRGx-REx-Dx-DEx where:
MRG represents the mapped RAID group;
RE represents RAID extent;
D represents disk;
DE represents disk extent; and
x represents a serial number, which is an integer larger than or equal to 0.

For example, if a certain disk extent is identified as "MRG0-RE0-D1-DE0," it indicates that the disk extent belongs to: mapped RAID group 0, RAID extent 0, disk 1, and disk extent 0 located in disk 1.

In the example as shown in FIG. 3, it is determined that disk 312 has already been failed (namely, disk 312 is the first disk). Thus, a rebuilding process for a plurality of data blocks in disk 312 will be initiated. At this time, if a disk 310 having a high risk of failure (namely, disk 310 is the second disk, and hereafter may also referred to as EOL disk) in the storage system 300 is determined, that is, PACO process has begun (PACO process is also illustrated schematically by arrow 101), then system 300 needs to determine whether the disk 310 contains a second data block associated with the first data block to be rebuilt in the disk 312.

Herein, the first data block and the second data block that are associated with each other refer to data blocks coming from the same data stripe in the storage system 300. In the example as shown in FIG. 3, data blocks having the same identifier "RE_ID" come from the same data stripe. For example, the first data block stored in the disk extent "MRG2-RE0-D2-DE2" of disk 312 and the second data block stored in the extent "MRG2-RE0-D0-DE2" of disk 310 are data blocks that are associated with each other.

Figure 4:
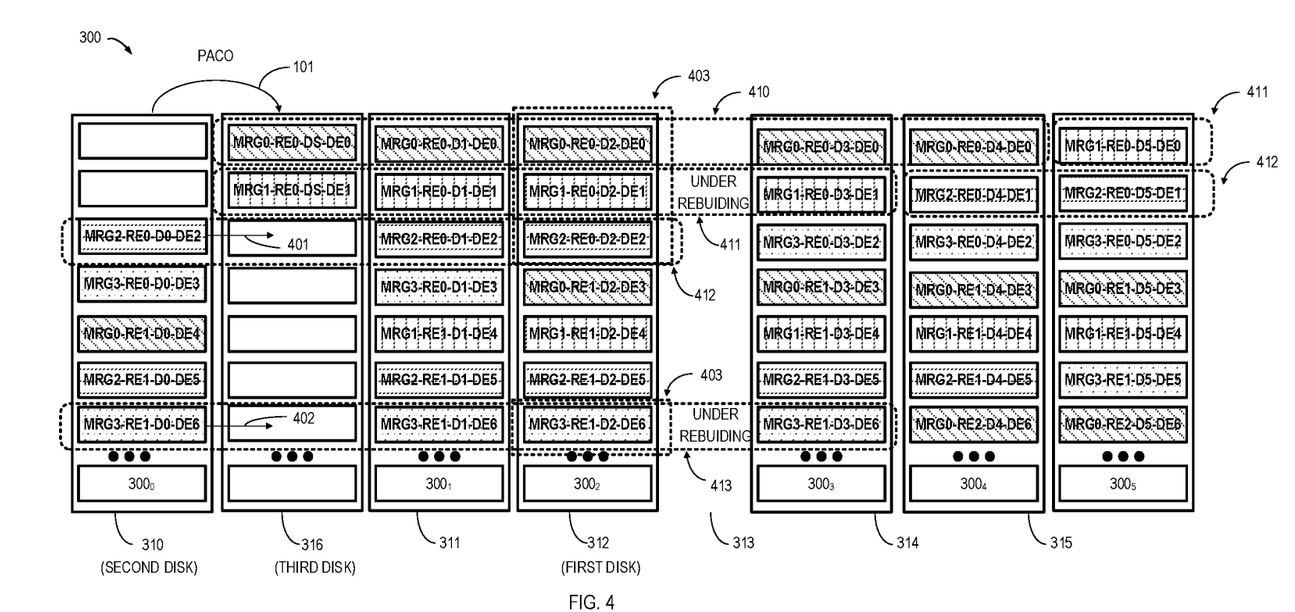
FIG. 4 illustrates a storage system during the ongoing data rebuilding process, in accordance with an embodiment of the present disclosure.

Next, referring to FIG. 4, after the data rebuilding process is initiated, data are rebuilt through the first group of RAID extents, namely, "MRG0-RE0" 410 and "MRG1-RE0" 411. Subsequently, data blocks stored in all the disk extents in "MRG0-RE0" 410 and "MRG1-RE0" 411 are read from disks to rebuild data blocks stored in disk extents MRG0-RE0-D2-DE0 and MRG1-RE0-D2-DE1 of disk 312.

As illustrated in FIG. 4, in some embodiments, before disk 312 is failed, PACO operation for disk 310 may have already been executed for a period of time. That means, the second data block contained in the two disk extents MRG0-RE0-D2-DE0 and MRG1-RE0-D2-DE1 of disk 310 may have already been replicated into the corresponding disk extents MRG0-RE0-DS-DE0 and MRG1-RE0-DS-DE1 in the third disk, where "DS" also represents the "third disk." Under this condition, the rebuilding process will only read the above-mentioned second data block from the third disk 316 to rebuild the first data block stored in the two disk extents MRG0-RE0-D2-DE0 and MRG1-RE0-D2-DE1 of the disk 312.

In this way, all data blocks in disk 310 need to be read for only once to complete both the data rebuilding process and the PACO process, regardless of whether part of data in the disk 310 have already been read and replicated into the third disk due to the PACO process. In other words, since the second data blocks in MRG0-RE0-D0-DE0 and MRG1-RE0-D0-DE1 have already been read once in the previous PACO process, during the data rebuilding process, they will no longer be read from disk 310 for a second time, and instead, they will be read from the third disk 316, which avoids the possibility of accelerating the failure due to the double-reading of the disk 310.

In some embodiments, after the rebuilding of the first data block in the disk extents MRG0-RE0-D2-DE0 and MRG1-RE0-D2-DE1 is completed, the rebuilt first data block above is further written into a backup disk in the storage system, and the version number of the rebuilt first data block is updated. As illustrated in the embodiment of FIG. 4, the backup disk may be implemented as backup disk extents $300_0$, $300_1$, . . . , $300_5$ that are distributed and located in disks. As such, when a disk is failed, the data blocks stored in these backup extents may be used to execute the rebuilding operation of the data blocks.

Continuing to refer to FIG. 4, meanwhile, the system 300 rebuilds data through the second group of RAID extents "MRG2-RE0" 412 and "MRG3-RE1" 413, respectively. Subsequently, data blocks stored in all disk extents in "MRG2-RE0" 412 and "MRG3-RE1" 413 are read from disks in the data rebuilding process to rebuild data blocks stored in the disk extents MRG2-RE0-D2-DE2 and MRG3-RE1-D2-DE6 of disk 312.

As illustrated in FIG. 4, the second data block contained in the disk extents MRG2-RE0-D0-DE2 and MRG3-RE1-D0-DE6 of disk 310 has not yet been replicated into the corresponding extent of the third disk. Therefore, the second data block described above is read from disk 310 to rebuild the associated first data block, and the read second data block is replicated into the third disk. In FIG. 4, the above replication process of the second data block is represented by arrows 401 and 402, and the data block under rebuilding is indicated by a dotted box 403.

Figure 5:
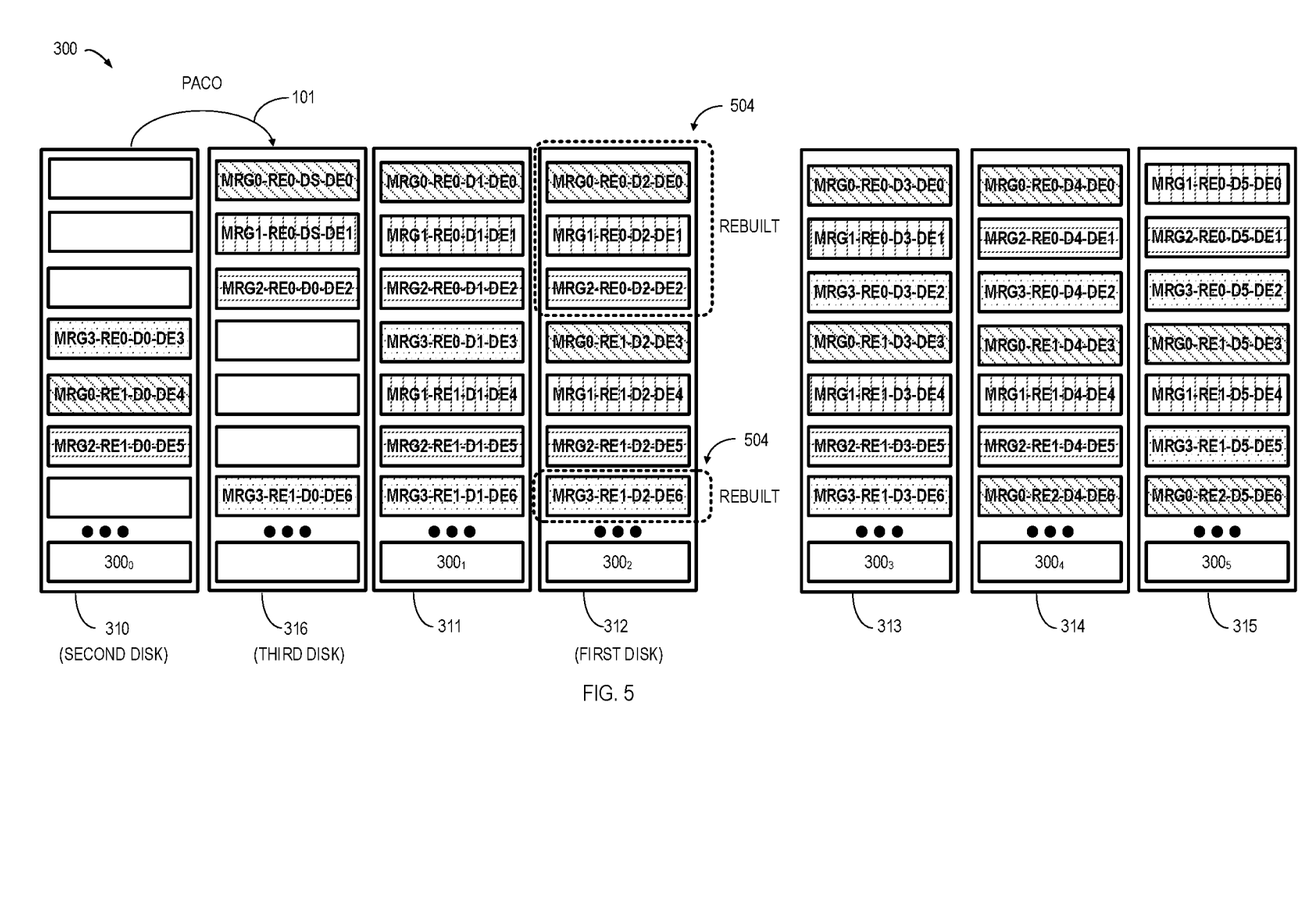
FIG. 5 illustrates a storage system upon completion of the rebuilding and PACO process of a part of the data blocks, in accordance with an embodiment of the present disclosure.

Similarly, in some embodiments, after the rebuilding of the first data block stored in the disk extents MRG2-RE0-D2-DE2 and MRG3-RE1-D2-DE6 of disk 312 is completed, the rebuilt first data block is further written into a backup disk in the storage system, and the version number of the rebuilt first data block is updated. FIG. 5 illustrates the storage system 300 after the rebuilding process and the PACO process of the above four data blocks are completed, where the rebuilt data blocks are indicated by a dotted box 504 in FIG. 5.

It is to be noted that although for the ease of discussion, the rebuilding process of respective first data block stored in the four disk extents MRG0-RE0-D2-DE0, MRG1-RE0-D2-DE1, MRG2-RE0-D2-DE2 and MRG3-RE1-D2-DE6 is depicted in a specific order in the embodiments as illustrated in FIGS. 3 and 4, it shall be appreciated that the rebuilding of the above plurality of data blocks may be executed in other orders or in parallel.

The respective rebuilding process of the first data block stored in the other three disk extents MRG0-RE1-D2-DE3, MRG1-RE1-D2-DE4 and MRG2-RE1-D2-DE5 in disk 312 is similar to the rebuilding process described above, thus omitted here.

Figure 6:
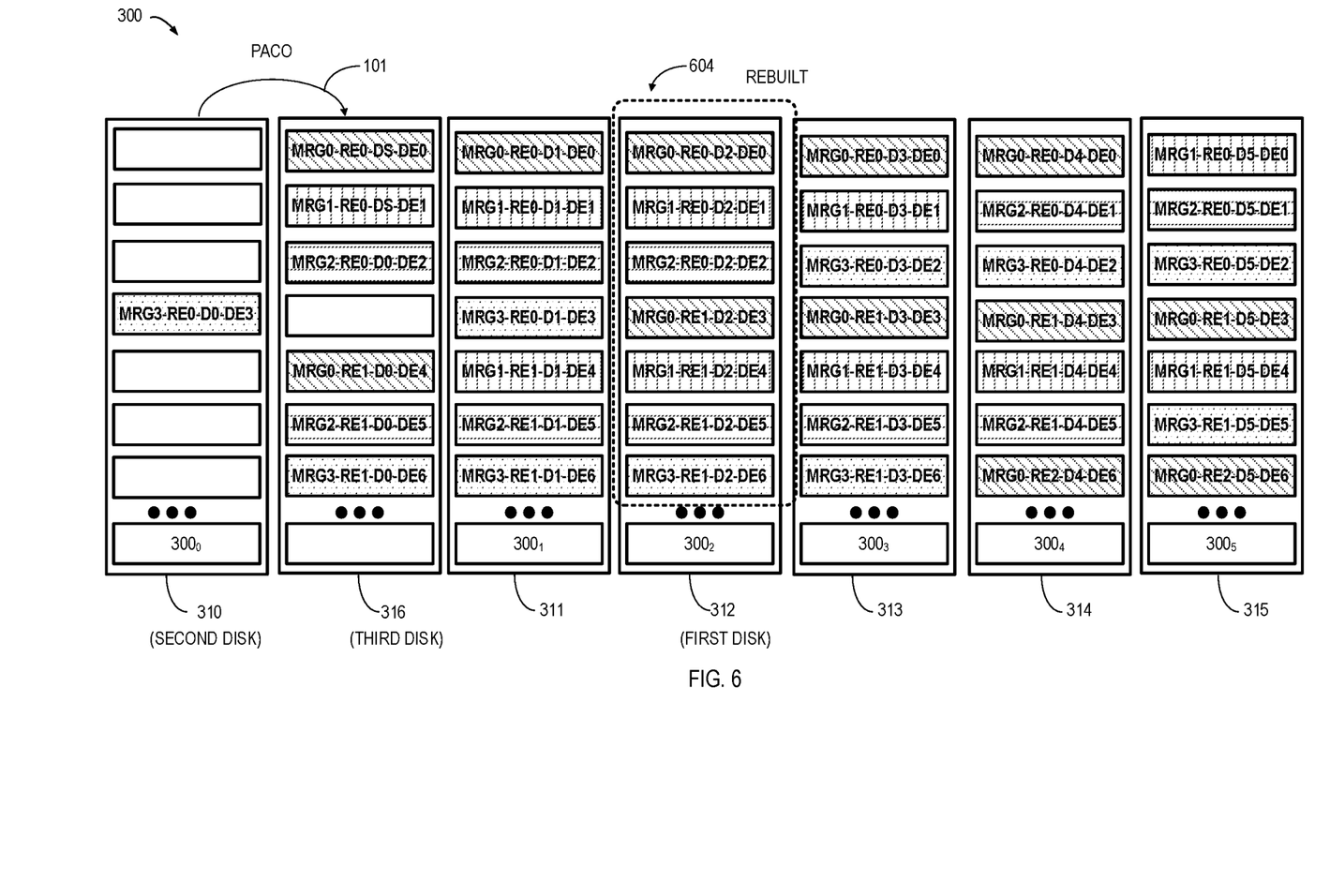
FIG. 6 illustrates a storage system upon completion of the rebuilding of all data blocks and PACO process of a part of the data blocks, in accordance with an embodiment of the present disclosure.
Figure 7:
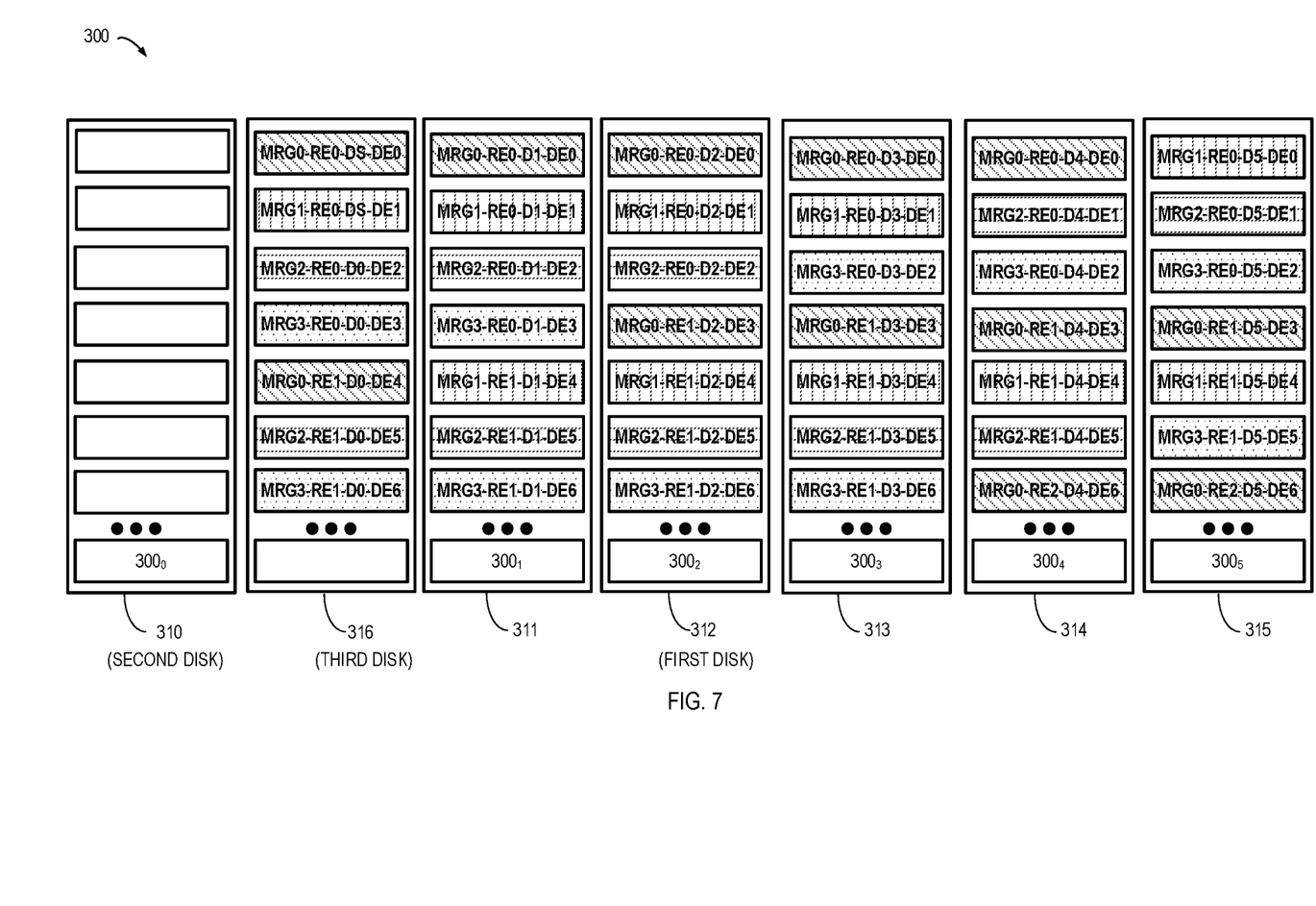
FIG. 7 illustrates a storage system upon completion of both rebuilding and PACO operation of all data blocks, in an accordance with embodiment of the present disclosure.

Now, referring to FIG. 6, in some embodiments, after the rebuilding of all data blocks in the first disk is completed, the third data block in disk 310 is replicated into the third disk to complete PACO operation. Herein, the "third data block" refers to a data block that is coming from a different data stripe in the storage system 300 than the data stripe which the first data block is coming from. The data block stored in the disk extent MRG3-RE0-D0-DE3 of disk 310 as shown in FIG. 6 is this case. Therefore, the third disk block is finally replicated into the third disk to complete PACO operation. FIG. 7 illustrates the storage system 300 after both the data rebuilding and PACO operation are completed.

In this way, since majority of data blocks have been migrated from disk 310 to the third disk during the rebuilding process, only a small portion of data blocks are to be replicated into the third disk after the rebuilding process is completed. This allows the PACO process to be completed soon after the rebuilding process, thereby reducing total time duration of operation.

In some embodiments, after the second data block is replicated into the third disk, it is also required to replicate the metadata of the second data block into the third disk, and only after that, the third disk can serve as a replacement for the second disk to provide data reading and writing operations.

Figure 8:
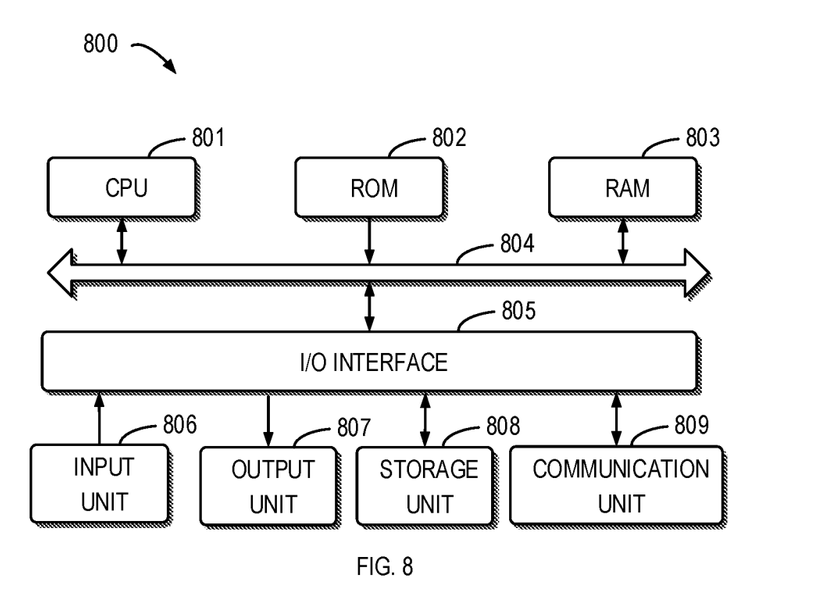
FIG. 8 illustrates a schematic block diagram of a device used to implement embodiments of the present disclosure.

FIG. 8 illustrates a schematic diagram of a device 800 that can be used to implement embodiments of the present disclosure. As indicated, the device 800 includes a central processing unit (CPU) 801, which can execute various appropriate actions and processing based on the computer program instructions stored in a read-only memory (ROM) 802 or the computer program instructions loaded into a random access memory (RAM) 803 from a storage unit 808. The RAM 803 also stores all kinds of programs and data required by operating the storage device 800. CPU 801, ROM 802 and RAM 803 are connected to each other via a bus 804, to which an input/output (I/O) interface 805 is also connected.

A plurality of components in the device 800 are connected to the I/O interface 805, including: an input unit 806, such as keyboard, mouse and the like; an output unit 807, such as various types of displays, loudspeakers and the like; a storage unit 808, such as the storage disk, optical disk and the like; and a communication unit 809, such as network card, modem, wireless communication transceiver and the like. The communication unit 809 allows the device 800 to exchange information/data with other devices through computer networks such as Internet and/or various telecommunication networks.

Each procedure and processing described above, such as method 200, can be executed by a processing unit 801. For example, in some embodiments, the method 200 can be implemented as computer software programs, which are tangibly included in a machine-readable medium, such as storage unit 808. In some embodiments, the computer program can be partially or completely loaded and/or installed to the device 800 via ROM 802 and/or the communication unit 809. When the computer program is loaded to RAM 803 and executed by CPU 801, one or more steps of the above described method 200 are implemented. Alternatively, in other embodiments, CPU 801 may also be configured to implement the above process/method in any other appropriate manner.

It shall be appreciated that the detailed embodiments of the present disclosure described above are by way of example only and explain principles of the present disclosure, rather than limit the present disclosure. Therefore, any amendment, equivalent arrangement and improvement without departing from the spirits and scope of the present disclosure shall all be considered included within the scope of the present disclosure.

We claim:

1. A method of data rebuilding in a storage system, comprising:
   in response to failure of a first disk in the storage system, determining a second disk having a high risk of failure in the storage system;
   determining whether the second disk contains a second data block that is associated with a first data block to be rebuilt in the first disk, the first and second data blocks being from a same data stripe in the storage system; and
   in response to determining that the second disk contains the second data block and the second data block has not yet been replicated into a third disk for backup in the storage system,
      reading the second data block from the second disk to rebuild the first data block, and
      replicating the read second data block into the third disk.

2. The method according to claim 1, further comprising:
   in response to determining that the second disk contains the second data block and the second data block has already been replicated into the third disk, reading the second data block from the third disk to rebuild the first data block.

3. The method according to claim 1, further comprising:
after the rebuilding of the first data block in the first disk is completed, replicating a third data block in the second disk into the third disk, the first and third data blocks being from different data stripes in the storage system.

4. The method according to claim 1, wherein the determining a second disk having a high risk of failure in the storage system comprises:
for a disk in the storage system, detecting an operating condition of the disk; and
in response to detecting at least one of the following operating conditions, determining the disk to be the second disk:
an operation of the disk fails, and
an operation threshold of the disk is reached.

5. The method according to claim 1, further comprising:
writing the rebuilt first data block into a backup disk of the storage system; and
updating a version number of the rebuilt first data block.

6. The method according to claim 1, further comprising:
replicating metadata of the second data block into the third disk.

7. The method according to claim 1, wherein:
the data rebuilding includes a rebuilding process for rebuilding the first disk and a proactive copy process for replicating the second disk to the third disk, the rebuilding process and proactive copy process being executed concurrently;
the proactive copy process, upon encountering data blocks of the second disk that have not yet been replicated to the third disk, copying the encountered data blocks from the second disk to the third disk; and
the rebuilding process performing the determining, reading and replicating steps for multiple second data blocks of the second disk, thereby copying the multiple second data blocks of the second disk to the third disk in connection with rebuilding corresponding data blocks of the first disk and causing the proactive copy process to refrain from copying the multiple second data blocks to the third disk.

8. A device of data rebuilding in a storage system, comprising:
a processing unit; and
a memory coupled to the processing unit and storing instructions, the instructions, when executed by the processing unit, implementing following acts:
in response to failure of a first disk in the storage system, determining a second disk having a high risk of failure in the storage system;
determining whether the second disk contains a second data block that is associated with a first data block to be rebuilt in the first disk, the first and second data blocks being from a same data stripe in the storage system; and
in response to determining that the second disk contains the second data block and the second data block has not yet been replicated into a third disk for backup in the storage system,
reading the second data block from the second disk to rebuild the first data block, and
replicating the read second data block into the third disk.

9. The device according to claim 8, wherein the acts further comprise:
in response to determining that the second disk contains the second data block and the second data block has already been replicated into the third disk, reading the second data block from the third disk to rebuild the first data block.

10. The device according to claim 8, wherein the acts further comprise:
after the rebuilding of the first data block in the first disk is completed, replicating a third data block in the second disk into the third disk, the first and third data blocks being from different data stripes in the storage system.

11. The device according to claim 8, wherein the determining a second disk having a high risk of failure in the storage system comprises:
for a disk in the storage system, detecting an operating condition of the disk; and
in response to detecting at least one of the following operating conditions, determining the disk to be the second disk:
an operation of the disk operates fails, and
an operation threshold of the disks is reached.

12. The device according to claim 8, wherein the acts further comprise:
writing the rebuilt first data block into a backup disk of the storage system; and
updating a version number of the rebuilt first data block.

13. The device according to claim 8, wherein the acts further comprise:
replicating metadata of the second data block into the third disk.

14. A computer program product having a non-transitory computer readable medium which stores a set of instructions for data rebuilding in a storage system; the set of instructions, when carried out by computerized circuitry, causing the computerized circuitry to perform a method of:
in response to failure of a first disk in the storage system, determining a second disk having a high risk of failure in the storage system;
determining whether the second disk contains a second data block that is associated with a first data block to be rebuilt in the first disk, the first and second data blocks being from a same data stripe in the storage system; and
in response to determining that the second disk contains the second data block and the second data block has not yet been replicated into a third disk for backup in the storage system,
reading the second data block from the second disk to rebuild the first data block, and
replicating the read second data block into the third disk.

* * * * *